(12) United States Patent
Williams

(10) Patent No.: US 8,286,948 B2
(45) Date of Patent: Oct. 16, 2012

(54) RAILING SYSTEM

(75) Inventor: Luc Williams, Saint-Alphonse (CA)

(73) Assignee: Williams Interlocking Systems Inc., Saint-Alphonse (CA)

( * ) Notice: Subject to any disclaimer, the term of this patent is extended or adjusted under 35 U.S.C. 154(b) by 861 days.

(21) Appl. No.: 11/678,354

(22) Filed: Feb. 23, 2007

(65) Prior Publication Data

US 2007/0200105 A1   Aug. 30, 2007

Related U.S. Application Data

(60) Provisional application No. 60/867,443, filed on Nov. 28, 2006.

(30) Foreign Application Priority Data

Feb. 24, 2006   (CA) .................................... 2537683

(51) Int. Cl.
*E04H 17/16* (2006.01)
*F16B 9/00* (2006.01)

(52) U.S. Cl. ......... 256/21; 256/22; 256/65.01; 403/242; 403/274; 403/280

(58) Field of Classification Search .................... 256/21, 256/22, 65.01, 65.02, 65.03, 65.16; 403/274, 403/280, 242
See application file for complete search history.

(56) References Cited

U.S. PATENT DOCUMENTS

| | | | |
|---|---|---|---|
| 118,156 A * | 8/1871 | Rohrere | 256/22 |
| 138,049 A * | 4/1873 | Sellers et al. | 256/21 |
| 1,630,338 A * | 5/1927 | Gail | 403/274 |
| 1,737,049 A * | 11/1929 | Kelly | |
| 2,056,123 A * | 9/1936 | Herz | |
| 2,976,018 A * | 3/1961 | Dellagala | 256/21 |
| 3,177,990 A * | 4/1965 | Flucker et al. | |
| 3,244,406 A * | 4/1966 | Garofola | 256/21 |
| 3,312,488 A * | 4/1967 | Lickliter | |
| 3,649,973 A * | 3/1972 | Benoit et al. | 256/22 |
| 3,776,523 A * | 12/1973 | Weiland | 256/59 |
| 3,828,414 A * | 8/1974 | Apple, Sr. | |
| 3,848,855 A * | 11/1974 | Weiland | 256/59 |
| 3,879,017 A * | 4/1975 | Maxcy et al. | 256/22 |
| 3,884,588 A * | 5/1975 | Apple, Sr. | |

(Continued)

FOREIGN PATENT DOCUMENTS

AU     6049973     *   3/1975

(Continued)

OTHER PUBLICATIONS

English Machine Translation of foreign reference, FR-2,404,084. 3 pages. Translated on Oct. 13, 2009.*

*Primary Examiner* — Victor MacArthur
(74) *Attorney, Agent, or Firm* — Norton Rose Canada LLP

(57) ABSTRACT

The railing system comprises at least one elongated rail having a plurality of spaced-apart openings. It also has a plurality of elongated pickets having opposite ends, each picket having at least one end provided with at least two spaced-apart retaining tabs initially extending lengthwise and configured to be inserted through a corresponding one of the openings of the rail. The tabs of the pickets are outwardly bendable to rigidly connect the pickets to the rail. This type of connection can be quickly achieved and lowers the manufacturing costs of railing systems.

14 Claims, 4 Drawing Sheets

U.S. PATENT DOCUMENTS

| | | | |
|---|---|---|---|
| 3,962,774 A | 6/1976 | Noro | |
| 4,014,520 A | 3/1977 | Walters | |
| 4,168,054 A * | 9/1979 | Weiland | 256/65.12 |
| 4,334,671 A | 6/1982 | De Guise | |
| 4,753,420 A | 6/1988 | Kaaria | |
| 4,805,879 A | 2/1989 | Spera | |
| 5,200,240 A | 4/1993 | Baker | |
| 5,520,475 A * | 5/1996 | Coolman et al. | 403/274 |
| 5,581,953 A * | 12/1996 | Ruff | |
| 5,649,688 A | 7/1997 | Baker | |
| 6,029,954 A | 2/2000 | Murdaca | |
| 6,299,142 B1 | 10/2001 | Chaney et al. | |
| 6,643,988 B1 * | 11/2003 | Armstrong et al. | |
| 6,752,385 B2 | 6/2004 | Zen et al. | |
| 2005/0051762 A1 | 3/2005 | Giralt | |

FOREIGN PATENT DOCUMENTS

| | | | |
|---|---|---|---|
| FR | 1271863 | * | 8/1961 |
| FR | 2404084 | * | 4/1979 |
| FR | 2568151 A1 | * | 1/1986 |
| GB | 27866 | * | 0/1911 |

* cited by examiner

US 8,286,948 B2

RAILING SYSTEM

CROSS-REFERENCE

The present application claims the benefits of Canadian patent application No. 2,537,683 filed Feb. 24, 2006 and entitled "Aluminum railings"; and the benefits of U.S. provisional patent application No. 60/867,443 filed Nov. 28, 2006 and entitled "Press for assembling railing systems", the content of both applications being hereby incorporated by reference.

BACKGROUND

Over the years, aluminium railing systems have become increasingly popular due to their relatively low cost combined with the vast number of innovative designs offered by manufacturers. The maintenance of these systems is very easy compared to wood or other competing materials. In addition to balustrades, aluminium railing systems (also referred to aluminum railing systems) are now also used extensively for other purposes, such as fences, ornamentations, etc.

In most railing systems, the balusters, hereafter generically referred to as pickets, are spaced apart between two parallelly disposed rails. The connection between the pickets and the rails involve screws or rivets connecting at least some of the pickets while other pickets can simply be held in place using intermediary spacers inserted in the rails.

One of the challenges when designing railing systems, in particular those made of aluminium, is to suitably connect the pickets and the rails together while still offering an aesthetically pleasing aspect and minimizing the costs. Room for further improvements always exists.

SUMMARY

In one aspect, there is provided a railing system comprising at least one elongated rail having a plurality of spaced-apart openings; and a plurality of elongated pickets having opposite ends, each picket having at least one end provided with at least two spaced-apart retaining tabs initially extending lengthwise and configured to be inserted through a corresponding one of the openings of the rail, the tabs of the pickets being outwardly bendable against the rail to rigidly connect the pickets to the rail.

In another aspect, there is provided a railing system comprising two spaced-apart and parallelly-disposed elongated rails having mutually-facing sides, each rail having a plurality of spaced-apart openings disposed lengthwise; and a plurality of elongated pickets rigidly connected to the rails, each picket having a central portion extending between the mutually-facing sides of the rails and having two opposite ends, each end having at least two spaced-apart retaining tabs extending through one respective opening among the openings of the rails, the tabs being outwardly deformed against the rails on sides opposite the mutually-facing sides.

In a further aspect, there is provided a method of connecting a picket and a rail of a railing system, the picket having at least two spaced-apart tabs at one end thereof, the tabs initially-extending lengthwise with reference to the picket, the method comprising inserting the tabs of the picket into an opening provided through two major sides of the rail, the picket having a shoulder defined between roots of the tabs at the end of the picket, the shoulder abutting against a first of the major sides of the rail after insertion of the tabs into the opening; and bending the tabs outwardly against a second of the major sides of the rail to rigidly connect the picket and the rail together.

DETAILED DESCRIPTION

The following detail description is made with reference to the appended figures which illustrate one or more non-limitative examples of the improved way of connecting pickets and rails in a railing system. The detailed description initially describes what is shown in the figures. A non-limitative list of examples of variants is provided at the end of the detailed description.

Figure 1:
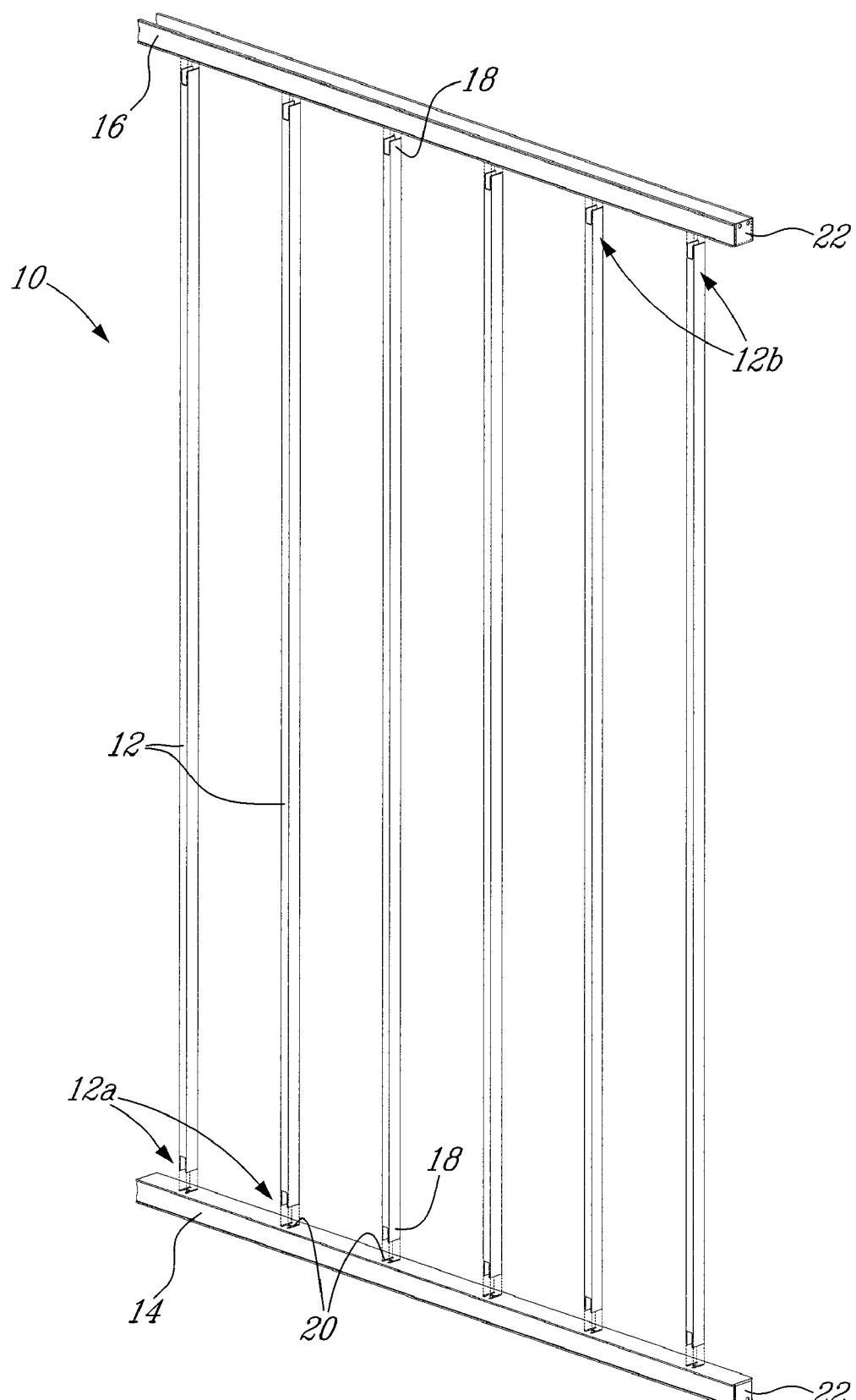
FIG. 1 is an isometric exploded view of an example of a section of a railing system with an example of the improved way of connecting the pickets and the rails, the parts being shown prior to connection.

FIG. 1 illustrates an example of a section 10 of a railing system designed with the improved way of connecting the pickets and the rails. The pickets 12 and the rails 14, 16 in FIG. 1 are illustrated prior to their assembly.

Figure 2:
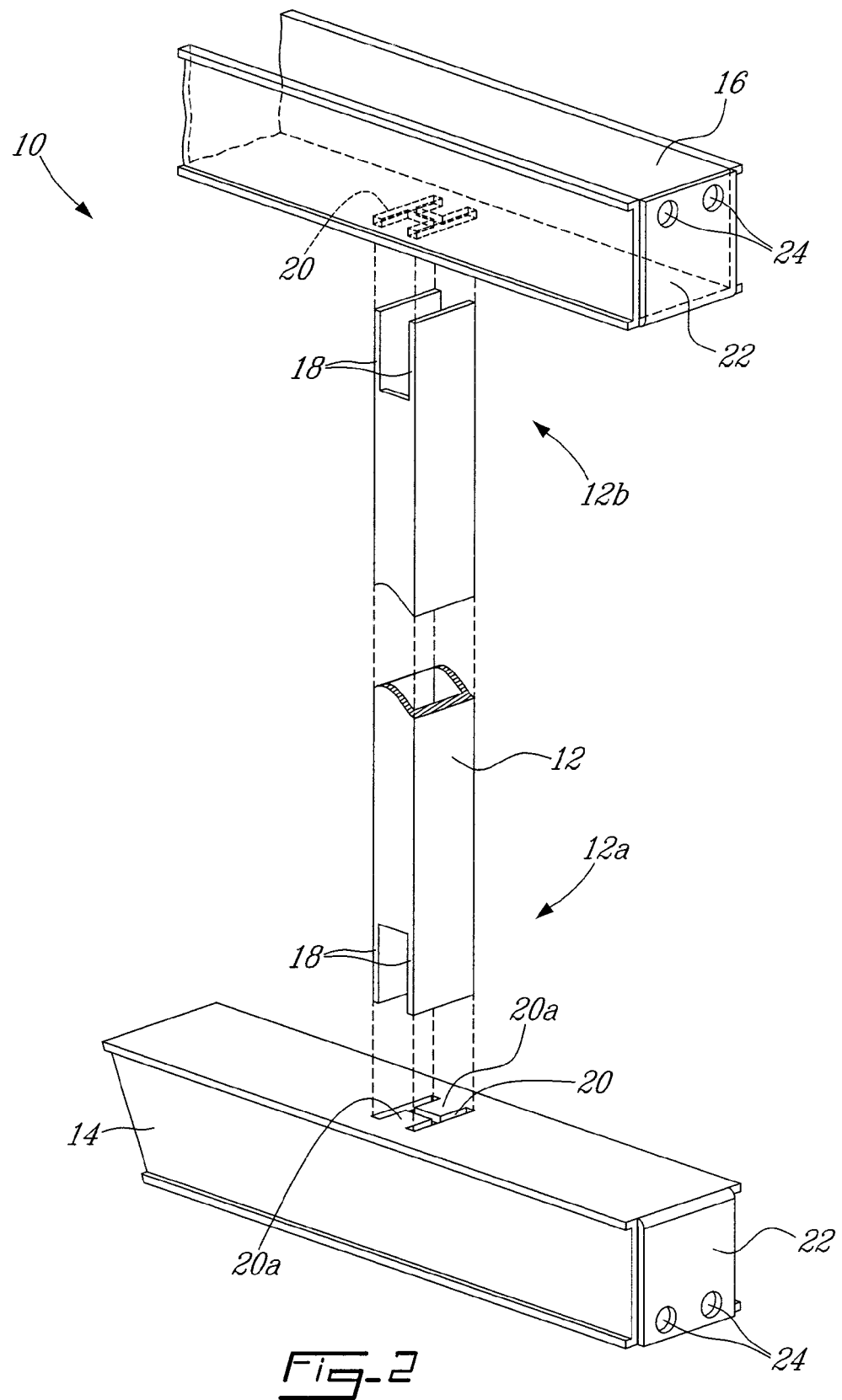
FIG. 2 is an enlarged and partial cross-sectional view of one of the pickets at the side of the section of the railing system shown in FIG. 1.

FIG. 2 is an enlarged, partial cross-sectional view of one of the pickets 12 at the side of the section 10 shown in FIG. 1. The picket 12 is in the form of an extruded hollow tube with a rectangular cross section. The pickets 12 have opposite ends 12a, 12b. Each end has a pair of parallel and spaced-apart retaining tabs 18 initially extending lengthwise. The tabs 18 are flat and a shoulder is defined at each end 12a, 12b of the pickets 12, between the roots of the tabs 18. The tabs 18 are made of a ductile material. As can be seen in the figures, tabs 18 at the opposite ends 12a, 12b of each picket 12 are configured to snugly fit into a corresponding pair of H-shaped openings 20, one opening 20 being in the bottom rail 14 and the other being in the upper rail 16. A plurality of these openings 20 are provided through the major sides of the rails 14, 16, namely the opposite sides corresponding to horizontally-extending top and bottom surfaces of each rail 14, 16. The rails 14, 16 are substantially U-shaped and parallel to each other. Both rails 14, 16 then have mutually-facing sides between which the pickets extend once connected. The illustrated upper rail 16 is designed to be used with a corresponding snap-in upper member (not shown) fitting thereon to hide the upper interior of the rail 16.

Also as illustrated, the ends of the rails 14, 16 have an optional bracket 22 provided with holes 24. Each bracket 22 is a bended end portion of the rail 14, 16 made prior to the assembly of the section 10. The brackets 22 are used to connect the assembled section 10 to a post or to another vertically-supporting surface of a supporting structure, such as a wall or the like. Each bracket 22 can be made as described in U.S. provisional patent application No. 60/867,443. It can also be made differently.

Figure 3:
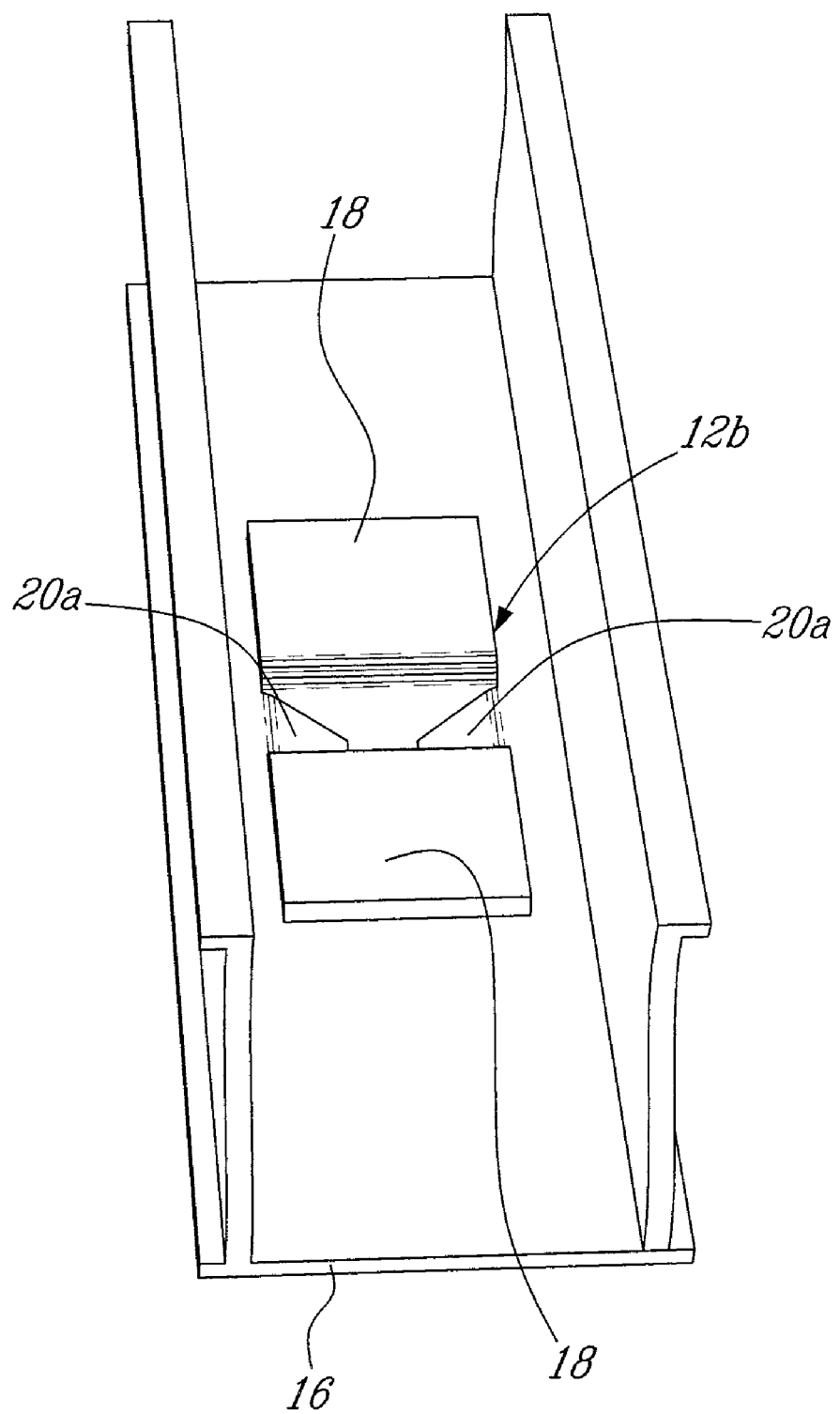
FIG. 3 is an isometric view showing an example of a portion of a rail with tabs of a picket bended to provide the rigid connection between them.
Figure 4:
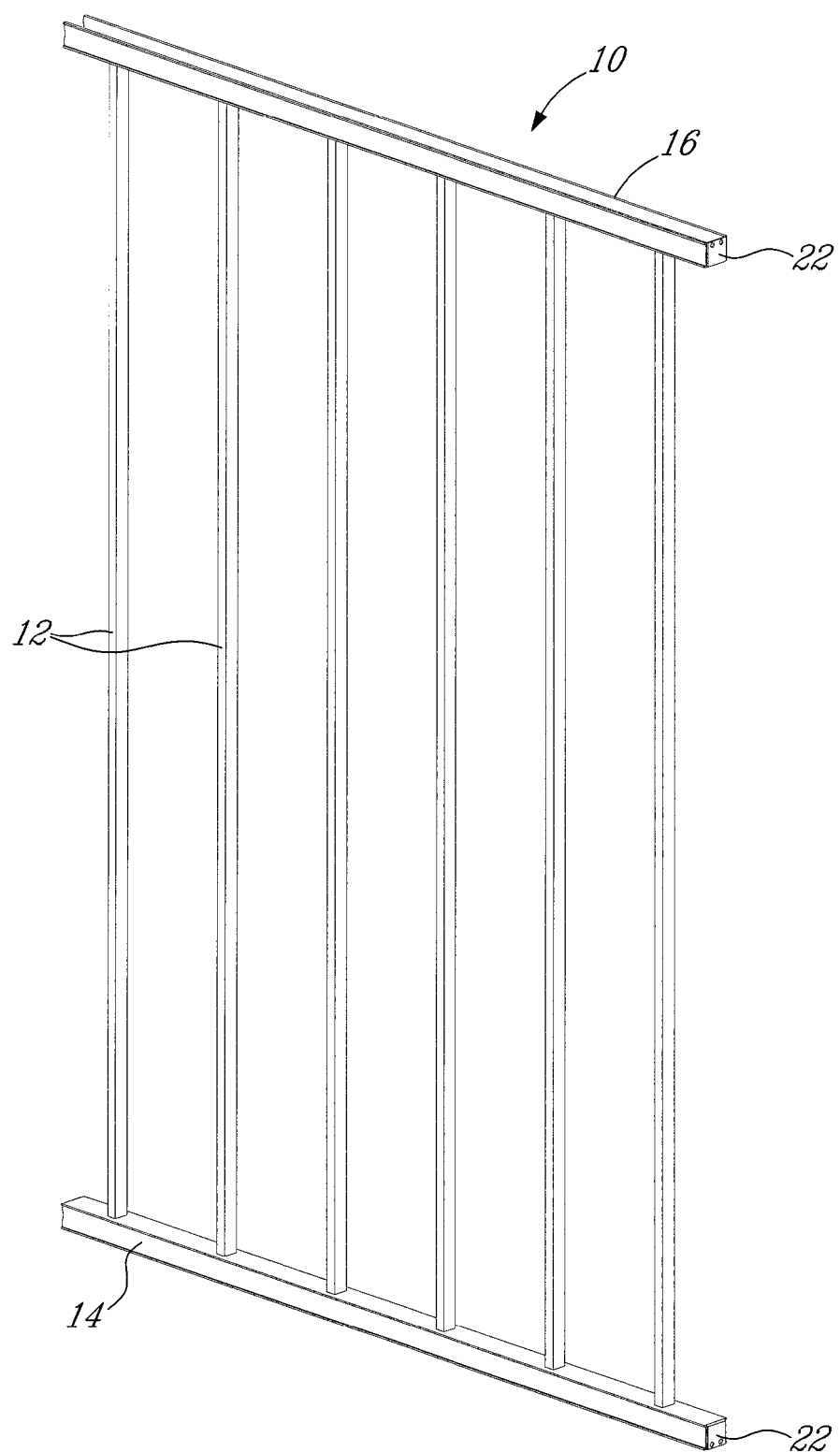
FIG. 4 is an isometric view of the example of the section of the railing system shown in FIG. 1 once the pickets are connected to the rails.

FIG. 3 is a perspective view of the upper end 12b of the picket 12 shown in FIG. 2 once the tabs 18 thereof are bended over the interior of the upper rail 16. The two opposite flanges 20a of the H-shaped opening 20 may also be slightly bended inside the interior of the picket 12, as shown. The roots of these flanges 20a engage a portion of a respective side of the shoulder of the upper end 12b to provide a transversal stability. This arrangement retains the picket 12 and the rail 16 so as to prevent them from moving relative to each other. Moreover, since the shoulders are prevented from entering the openings 20, the pickets do not require additional element to hold them in place.

It should be noted that the bracket 22 is not shown in FIG. 3. The connection between the bottom end 12a of the picket 12 and the bottom rail 14 is identical in the illustrated embodiment.

The above-mentioned improved way of connecting a picket 12 and a rail 14, 16 has many advantages. One of them is that the use of screws or rivets is highly minimized since they are not required for connecting pickets and rails. Screws or rivets, particularly those made of stainless steel, are relatively expensive and require an intensive and time-consuming labour when used as often as they were in conventional railing systems. The improved way of connecting pickets and rails thus saves time and lowers the manufacturing costs.

As aforesaid, the improved way of connecting the pickets 12 and the rails 14, 16 requires that the tabs 18 of the pickets 12 be bended during the assembly. This can be done, for instance, using a hand tool, such as a hammer or a set of pliers. It is also possible to highly increase productivity by using a press designed to connect two or more pickets 12 with one or more rails 14, 16 simultaneously. This press can be used to assemble sections 10 of the railing system very quickly and efficiently. An example of a press is shown in U.S. provisional patent application No. 60/867,443. It can also be made differently.

Aluminium is the material of choice for the railing system. Nevertheless, it is possible to use some parts made of a material that does not contain aluminium or parts that are not entirely made of a material containing aluminium. For instance, the central portion of the pickets can be made of one material and its ends of another material, in particular a ductile material. The rails and the pickets are not necessarily made of the same material or even made of a metal.

It should be noted that the pickets can have another outer cross section, including a rounded or a triangle cross section, or a cross section with more than four sides. The interior of the pickets can be solid instead of being hollow, as illustrated. Pickets of various shapes can be used in the same section. Some sections can have areas without pickets connected as described herein, either for insertion of an ornamentation or to mount pickets using another technique. Pickets of a same section can be irregularly shaped. Similarly, the tabs and the corresponding openings can have a different shape that what is shown, depending on the needs. The exact shape and configuration of the rails can also be different than that illustrated in the figures and accordingly, the rails are not necessarily U-shaped. The rails and the pickets are not necessarily perpendicular. For example, the ramp of a stairway would have vertical pickets connected to inclined rails. The rails can be curved instead of being straight. In case of fences, only the bottom end of the pickets may be rigidly connected to a rail using the improved way described herein. A second rail can be present in the section of the railing system but this upper rail is not necessarily connected to the upper end of the pickets. The upper rail can be stamped in such a way that each opening for the pickets has a downwardly-projecting tab on one side thereof. This tab is provided for receiving a fastener, such as screws or rivets, so as to hold the upper rail to the pickets. It is not necessary, however, to have a fastener at each picket. The upper ends of the picket can be flat or otherwise shaped. Some or all may be receiving an ornament, for example an arrow-shaped member.

It should be noted that removable brackets or other connection systems (not shown) can also be used instead of the integral brackets of the illustrated example.

The shape of the tabs and the shapes of the corresponding openings in the rails can be different than that shown in the enclosed figures, the H-shaped opening being only one possible type of opening. For instance, a square- or rectangular-like opening is possible. Similarly, using two unconnected adjacent slits would have been possible instead of the H-shaped opening. Together, these two adjacent slits form an equivalent of an opening. The tabs and the openings can be different between the ones at the bottom rail and those at the upper rail. If desired, only some of the connections between the pickets and the rails of a same section can use tabs and openings as described. Still, various combinations of two or more different sets of tabs and/or openings can be used at the top and/or at the bottom. Although tabs are said to be bended once connected to the rail or rails, the word "bended" or the similar words do not necessarily means that that they must be bended at an angle of 90 degrees near their root. These words also mean that the tabs can be otherwise deformed.

What is claimed is:

1. A railing system comprising:
    at least one elongated rail having a plurality of spaced-apart openings with at least one flange extending in each spaced-apart opening; and
    a plurality of hollow elongated pickets having opposite ends, at least one of the ends provided with at least two spaced-apart retaining tabs initially extending lengthwise and inserted through one corresponding opening among the openings of the rail, the tabs of the pickets being outwardly bendable against the rail to rigidly connect the pickets to each corresponding opening of the rail, the flange of the at least one elongated rail being bent into an interior of the corresponding hollow elongated picket to engage an interior surface of the corresponding hollow elongated picket in an oblique relation with respect to the hollow elongated pickets.

2. The railing system as defined in claim 1, wherein the at least one elongated rail has a plurality of spaced-apart openings each forming two of said flange in each spaced-apart opening so that the openings in the rail are H-shaped, the two flanges each bent into the interior of the corresponding hollow elongated picket in said oblique relation.

3. The railing system as defined in claim 2, wherein the tabs are bended orthogonally with reference to a longitudinal axis of the corresponding hollow picket.

4. The railing system as defined in claim 1, wherein each picket has a rectangular outer cross section.

5. The railing system as defined in claim 1, wherein at least the tabs are made of a ductile material including aluminium.

6. The railing system as defined in claim 1, wherein at least one end of the rail includes a bracket provided to connect the rail to a vertically-extending surface.

7. The railing system as defined in claim 6, wherein the bracket is made in a bended portion of the rail.

8. A railing system comprising:
    two spaced-apart and parallelly-disposed elongated rails having mutually-facing sides, each rail having a plurality of spaced-apart openings disposed lengthwise with at least one flange in each of the spaced-apart openings; and
    a plurality of hollow elongated pickets rigidly connected to the rails, each picket having a central portion extending between the mutually-facing sides of the rails and having two opposite ends, each end having at least two spaced-apart retaining tabs extending through one respective opening among the openings of the rails, the tabs being outwardly deformed against the rails on sides opposite the mutually-facing sides, the flange of the elongated rails being bent into an interior of the corresponding hollow elongated picket to engage an interior surface of the corresponding hollow picket in an oblique relation with respect to the hollow elongated pickets.

9. The railing system as defined in claim 8, wherein the elongated rails having two of said flanges in each spaced-apart openings so that the openings in the rails are H-shaped when the flanges are not bent, the two flanges each bent into the interior of the corresponding hollow elongated picket in said oblique relation.

10. The railing system as defined in claim 8, wherein the tabs are bended orthogonally with reference to a longitudinal axis of the corresponding hollow pickets.

11. The railing system as defined in claim 8, wherein each picket has a rectangular outer cross section.

12. The railing system as defined in claim 8, wherein at least the tabs are made of a ductile material including aluminium.

13. The railing system as defined in claim 8, wherein at least one end of the rails includes a bracket provided to connect the rail to a vertically-extending surface.

14. The railing system as defined in claim 13, wherein the bracket is made in a bended rail portion.

\* \* \* \* \*